United States Patent
Green

(10) Patent No.: US 10,560,464 B2
(45) Date of Patent: Feb. 11, 2020

(54) SYSTEMS AND METHODS FOR IDENTIFYING ELECTRONIC MESSAGES CONTAINING MALICIOUS CONTENT

(71) Applicant: MASTERCARD INTERNATIONAL INCORPORATED, Purchase, NY (US)

(72) Inventor: Ronald Green, Waxhaw, NC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 141 days.

(21) Appl. No.: 15/223,715

(22) Filed: Jul. 29, 2016

(65) Prior Publication Data

US 2017/0034185 A1 Feb. 2, 2017

Related U.S. Application Data

(60) Provisional application No. 62/198,364, filed on Jul. 29, 2015.

(51) Int. Cl.
*H04L 9/00* (2006.01)
*H04L 29/06* (2006.01)

(52) U.S. Cl.
CPC ........ *H04L 63/123* (2013.01); *H04L 63/0876* (2013.01); *H04L 63/1416* (2013.01)

(58) Field of Classification Search
CPC .................................................. H04L 63/123
See application file for complete search history.

(56) References Cited

U.S. PATENT DOCUMENTS 9,223,972 B1 * 12/2015 Vincent .................. G06F 21/566
2009/0327168 A1 * 12/2009 Weinberger ............. H04L 51/12
706/11

(Continued)

FOREIGN PATENT DOCUMENTS

JP    2013-149063    8/2013
WO   WO2015/072041  5/2015

OTHER PUBLICATIONS

Kimoto, Hiroshi et al.; Information Security; The Journal of Information Science and Technology Association; Aug. 1, 2012; vol. 62, No. 8, pp. 329-335.

*Primary Examiner* — Alexander Lagor
*Assistant Examiner* — Syed M Ahsan
(74) *Attorney, Agent, or Firm* — Harness, Dickey & Pierce, P.L.C.

(57) ABSTRACT

Systems and methods are provided herein for use in identifying and/or detecting electronic message containing malicious content. One exemplary method includes receiving multiple electronic tags. Each of the multiple electronic tags corresponds to an electronic message and a use, and the user caused the electronic tag to be associated with the electronic message based on a perception that the electronic message included malicious content. The exemplary method further includes assigning, for each electronic tag, point(s) to the corresponding user when the corresponding electronic message includes malicious content, totaling, for each user, the point(s) assigned during a predefined interval, and identifying one of the user(s) with a highest total point(s), for the defined interval, as a winner, thereby incentivizing users to associate electronic tags with electronic message perceived to include malicious content.

19 Claims, 5 Drawing Sheets

(56) References Cited

U.S. PATENT DOCUMENTS

2015/0067533 A1\* 3/2015 Volach ................. G06Q 10/107
715/752
2017/0026399 A1\* 1/2017 Gatti ................... H04L 63/1433

\* cited by examiner

SYSTEMS AND METHODS FOR IDENTIFYING ELECTRONIC MESSAGES CONTAINING MALICIOUS CONTENT

CROSS-REFERENCE TO RELATED APPLICATION

This application claims the benefit of, and priority to, U.S. Provisional Application No. 62/198,364 filed on Jul. 29, 2015. The entire disclosure of the above application is incorporated herein by reference.

FIELD

The present disclosure generally relates to systems and methods for identifying, detecting, etc., via user tagging, electronic messages (e.g., email, etc.) containing malicious content, and specifically, emails containing malicious content.

BACKGROUND

This section provides background information related to the present disclosure which is not necessarily prior art.

The exchange of electronic messages between companies and individuals, individuals and individuals, etc., has become ubiquitous as a manner of communication for a variety of purposes. For example, companies routinely provide email accounts to employees, through which the employees conduct the business of the companies, both internally and with third parties, such as clients, outside vendors, partners, etc. In certain instances, the employees' email accounts are usable for personal communications, unrelated to the business. Regardless of the purpose, email accounts are occasionally the access point for the introduction of malicious content, such as, e.g., spam, viruses, worms, Trojans, etc., into networks, or computing devices, provided by the companies. Email servers, in many instances, employ a variety of different software and/or tools to identify and block such emails, before the emails reach their employee recipients.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

As emails (broadly, electronic messages) have become commonplace within networks, emails have also become a targeted carrier for malicious content including, for example, malware, spam, viruses, adware, spyware, etc., into computing devices and/or networks. The malicious software is often included in an email as an attachment or a link, which when selected by a user, causes the malicious software to be executed and, in some instances, proliferated to or through a network. Various different firewalls and other hardware and software solutions are provided which attempt to block entry of emails containing malicious software, or otherwise remove the malicious content. Uniquely, the methods and systems described herein go further and provide for tagging of emails suspected of carrying malicious software, by users receiving the emails, where the users are then assigned scores for the tagging (for emails actually containing malicious content) in order to improve the organization's ability to detect, remove or prevent the malicious content from having any adverse effect on the organization. To provide a gamification impact, scores for tagging emails, per user, are accumulated over one or more time intervals. After the time interval, such as, for example, a month or multiple months, a user, with the highest score, is determined to be a winner and/or a champion, is notified, and may, in certain embodiments, be rewarded. In this manner, the methods and systems herein employ the users actually receiving the emails, often ordinary employees focused on tasks unrelated to computer/network security, as an additional line of defense against malicious software.

Figure 1:
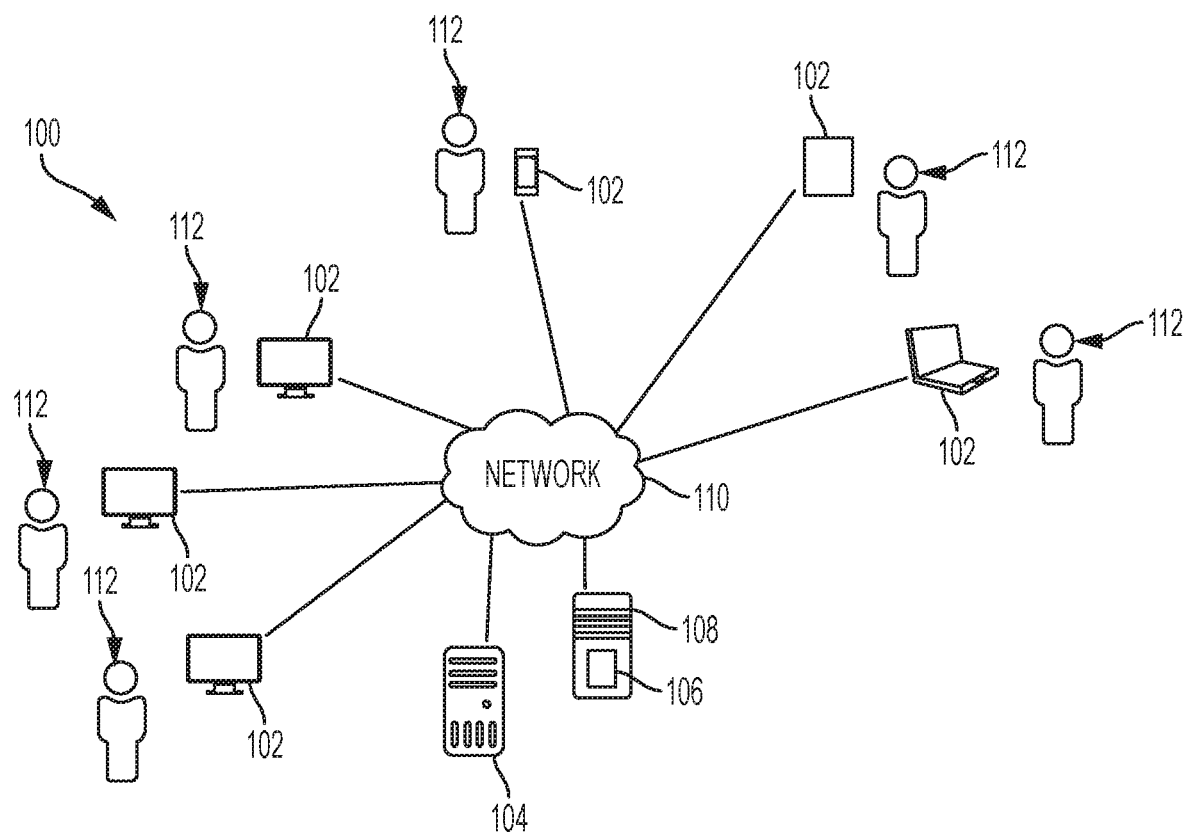
FIG. 1 is a block diagram of an exemplary system of the present disclosure suitable for use in identifying electronic messages containing malicious content.

With reference now to the drawings, FIG. 1 illustrates an exemplary system 100 for use in identifying, detecting, etc. electronic messages, for example, emails, etc., containing malicious content, and in which one or more aspects described herein may be implemented. It should be appreciated that, although in the illustrated embodiment, the system 100 is presented in one arrangement, other embodiments may include the same or different components arranged otherwise, for example, depending on a particular type of electronic message received by a user, means for receiving electronic messages, a volume of electronic message traffic, etc.

The system 100 generally includes multiple communication devices, each referenced 102, a message server 104, and a phishing engine 106. In FIG. 1, the engine 106 is shown as incorporated into communication device 108. However, it should be appreciated that, in other embodiments, the engine 106 may be incorporated into the message server 104, or employed otherwise, as desired. Further, the message server 104 may be located in the same location, geographically, as the communication device 102 and communication device 108, or may be remote from one or more of the same, as desired. The communication devices 102, the message server 104, and the communication device 108 are coupled to one another, via a network 110. The network 110 may include, without limitation, a wired and/or wireless network, one or more local area network (LAN), wide area network (WAN) (e.g., the Internet, etc.), mobile network, another network as described herein, and/or any other suitable network or combination of networks. In one example, the network 110 includes a private LAN within the geographical location of an entity (e.g., a company, etc.), coupled to a public network, through which one or more users 112 may access their message accounts (at message server 104, for example, in FIG. 1) via communication devices 102.

It should be understood that the message server 104 may be suited, additionally, or alternatively, to host a variety of different message formats. In the exemplary embodiment herein, however, for ease of reference, the message server 104 is described as an email, or electronic mail, server. With that in mind, each of the users 112, illustrated in FIG. 1, is assigned a message account (e.g., by the message service 104, by another, etc.), designated by an email address (e.g., JohnSmith@email.com). Simply, the email address permits messages, directed to the particular users 112, to be received and stored by the message server 104 and associated with the proper message account. The users 112 are then able to access the electronic messages, via a suitable application (e.g., Microsoft Outlook®, Yahoo® mail application, Gmail® application, Hotmail® application, Apple® application, etc.) or webmail (e.g., accessible via a web browser, etc.), or broadly, via any message client, etc.

Each communication device 102 includes, or has access to, one or more such message clients, whereby the users 112 are able to access and/or view emails sent to and/or sent from their message accounts via their communication devices 102. In at least one embodiment, the message client may be specific to the type and/or location of particular ones of the communication devices 102. Specifically, for example, Microsoft Outlook® may be used in the office, while webmail, via a web browser, or suitable application, may be used at a portable communication device 102 (e.g., a tablet, a smartphone, etc.) by a user 112, outside of the office.

Each of the users 112 in the system 100 is affiliated with a common entity, such as an employer, who operates and manages the engine 106. The employer may use aspects of the present disclosure to encourage the employee users 112 to tag electronic messages that the employee users 112 perceive to include malicious content (e.g., malware, spam, viruses, adware, spyware, etc.), and then reward the users 112 (or at least one of the users 112), for example, for participation, for success, etc. This will be described in more detail hereinafter. It should be appreciated, however, that the users 112 need not be affiliated in any particular way with a common entity, as employees, etc., for example, in order to tag electronic messages to the engine 106, as described herein. Rather, the user 112 may, for example, include different users whose affiliation is use of electronic mail, in general, or specific to an electronic mail service (e.g., Gmail® webmail by Google®, etc.) and/or type.

The communication devices 102 of the system 100 may include, without limitation, a tablet computer (e.g., an iPad™, a Samsung Galaxy™ tablet, etc.), a personal computer, a laptop, a workstation, a handheld computer or communication device (e.g., a netbook, a specialized reservation device, etc.), a smartphone (e.g., an iPhone™, a Samsung™ phone, a HTC™ phone, etc.), or combinations thereof. Similarly, any suitable message server 104 and/or communication device 108, as known to those skilled in the art, may be employed.

Figure 2:
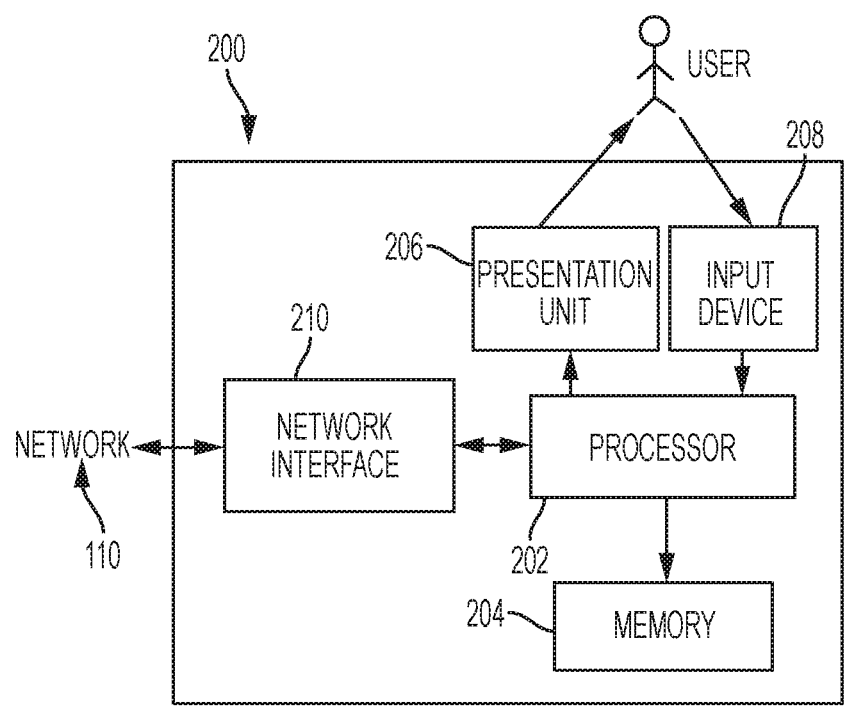
FIG. 2 is a block diagram of an exemplary computing device that may be used in the system of FIG. 1.

FIG. 2 illustrates an exemplary computing device 200. In the exemplary embodiment of FIG. 1, each of the communication devices 102 and 108, and the message server 104, is a computing device consistent with computing device 200. The system 100, however, should not be considered to be limited to the computing device 200, as different computing devices and/or arrangements of computing devices may be used. In addition, different components and/or arrangements of components may be used in other computing devices. Further, the computing devices may include one computing device, or multiple computing devices located together or distributed over a geographic region, so long as the computing devices are specifically configured to function as described herein.

With reference again to FIG. 2, the illustrated computing device 200 generally includes a processor 202, and a memory 204 that is coupled to the processor 202. The processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor configured to be capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, CD-ROMs, thumb drives, tapes, flash drives, hard disks, and/or any other type of volatile or non-volatile physical or tangible computer-readable storage media. The memory 204 may be configured to store, without limitation, electronic messages (e.g., emails, etc.), point values or points, tags, total scores, addresses, defined intervals, and/or other information usable as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

The illustrated computing device 200 also includes a presentation unit 206 that is coupled to the processor 202. The presentation unit 206 outputs, or presents, to a user (e.g., one or more of the users 112, individuals associated with the message server 104 and/or engine 106, etc.) by, for example, displaying, and/or otherwise outputting data such as, but not limited to, electronic messages, notifications, and/or any other type of data. It should be further appreciated that, in some embodiments, the presentation unit 206 comprises a display device such that various interfaces (e.g., applications, webpages, mail clients, etc.) may be displayed at computing device 200, and in particular at the display device, to display such information and data, etc. And in some examples, the computing device 200 may cause the interfaces to be displayed at a display device of another computing device including, for example, a server hosting a website having multiple webpages, etc. With that said, presentation unit 206 may include, without limitation, a liquid crystal display (LCD), a light-emitting diode (LED) display, an organic LED (OLED) display, an "electronic ink" display, speakers, combinations thereof, etc. In some embodiments, presentation unit 206 includes multiple units.

The computing device 200 further includes an input device 208 that receives input from the user of the computing device 200, including, for example, selections to open emails, selections of "Suspicious Mail" buttons, selections of "Junk" mail buttons, etc. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in some exemplary embodiments, a touch screen, such as that included in a tablet, a smartphone, or similar device, behaves as both a presentation unit and an input device. In at least one exemplary embodiment, a presentation unit and/or an input device are omitted from a computing device.

In addition, the illustrated computing device 200 includes a network interface 210 coupled to the processor 202 (and, in some embodiments, to the memory 204 as well). The network interface 210 may include, without limitation, a wired network adapter, a wireless network adapter, a mobile telecommunications adapter, or other device capable of communicating to one or more different networks, including the network 110. In some exemplary embodiments, the computing device 200 includes the processor 202 and one or more network interfaces incorporated into or with the processor 202.

Referring again to FIG. 1, in the system 100, when an electronic message directed to one of the users 112 is received, the message server 104 directs the electronic message to the appropriate user. Often, the user 112 accesses the electronic message through his/her message account to which the electronic message was sent, via an application and/or program (e.g., Microsoft Outlook® program, Yahoo® mail application, Gmail® application, Hotmail® application, Apple® application, etc.) (e.g., installed on a personal computer, smartphone, tablet computer, other devices, etc.), or webpage, supported on or by the user's communication device 102. The user 112 may view the electronic message, at the communication device 102, for example, in a message listing (i.e., organized, for example, by sender, date, subject, etc.), in a message preview or view (i.e., displaying at least a part of the message content), or a combination of both, or in various other manners.

Figure 3:
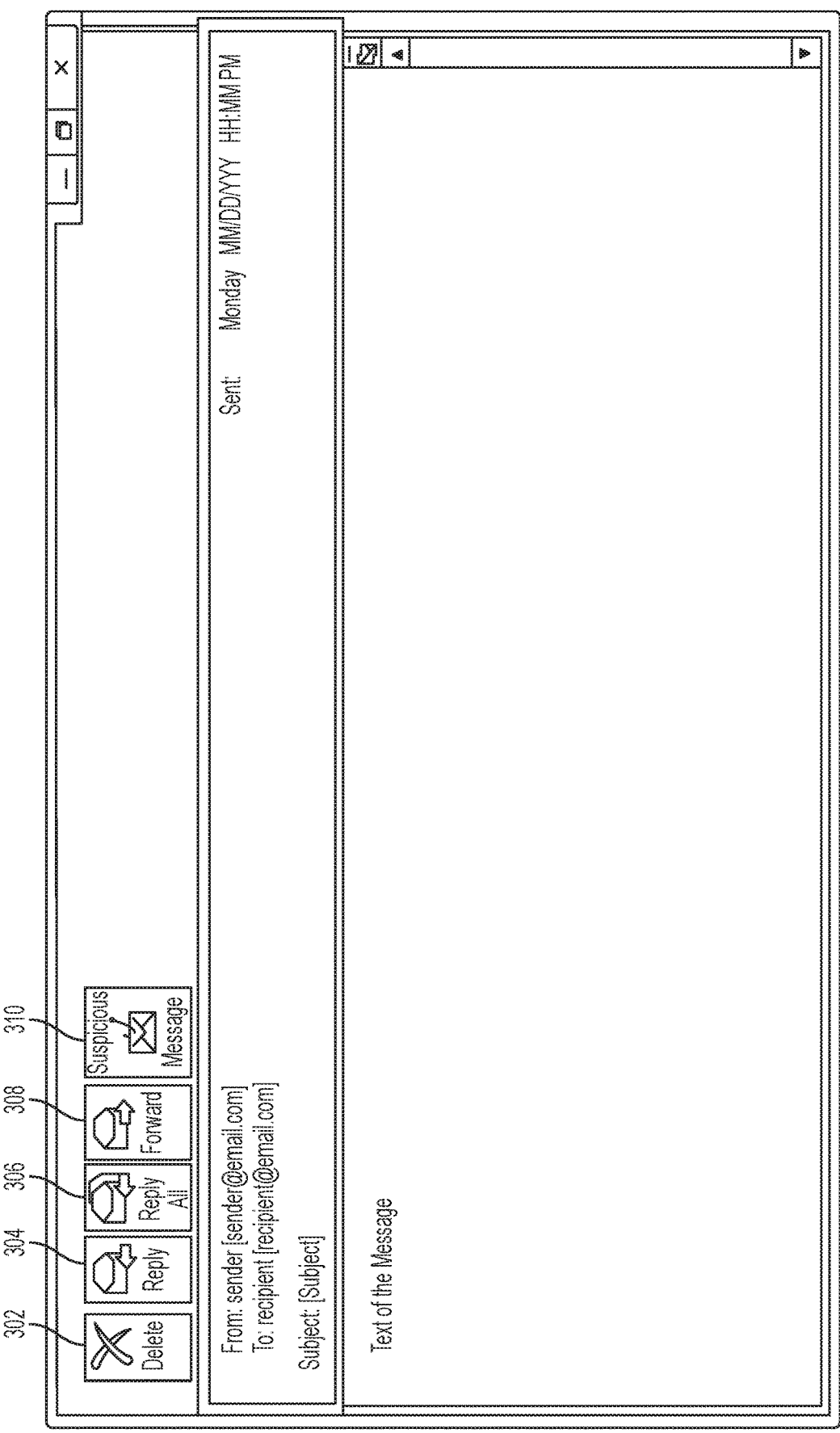
FIG. 3 is an exemplary email interface for use, by a user, to indicate a perception of malicious content within an email message.

FIG. 3 illustrates an exemplary message interface 300, by which a user (e.g., one of the users 112, etc.) is able to view an exemplary email message, or part thereof. The interface 300, in this example, includes various options for the user to process the message, for example, to delete the message via button 302, to reply via button 304, to reply all via button 306, to forward the message via button 308, etc. While not shown, the interface 300 may include other options for the user to save the message, etc. in other embodiments. These options, and various message information (e.g., sender, date, subject, etc.), are commonly included in message interface 300, regardless of the particular message client and/or account. In addition, the interface 300 further includes a "Suspicious Message" or "Junk" button 310, for use as described below. In other embodiments, the "Suspicious Message" or "Junk" button 310 may be located, additionally, or alternatively, in a listing with or in another presentation of the message to the user. Broadly, the "Suspicious Message" or "Junk" button 310 may be located generally anywhere in an interface, at one location or at multiple locations, for the convenience of the user. The "Suspicious Message" or "Junk" button, in some embodiments, may further be located in a preview or listing interface, whereby the user is able to select the button, when multiple different electronic messages are selected.

It should be appreciated that, in the illustrated message interface 300, the "Suspicious Message" or "Junk" button 310 may be associated with further functionalities in other embodiments, including, for example, tagging electronic messages to be filtered, even when there is no perception that the electronic messages include malicious content, etc.

If, after viewing the email message in the interface 300, or any part thereof, the user perceives the message as including malicious content (e.g., includes attached software, includes a link, etc. that the user perceives as potentially malicious), the user selects the "Suspicious Message" or "Junk" button 310, thereby applying an electronic tag to the email (or electronic message). In response, the application, program, or website, in which the message is being viewed, causes an electronic tag to be associated with (or appended to) the message (or the multiple messages) and/or transmitted to the engine 106, via network 110. In various embodiments, the electronic tag includes the email (or a copy of the email) automatically forwarded to a message account associated with the engine 106 (via message server 104, for example) and accessible by, for example, a system administrator, an information technology representative, etc. Alternatively, the electronic tag may include a message sent to the engine 106, which is separate from the tagged message, and which identifies the specific tagged message, the user that tagged the message, etc. The electronic tag may be provided in any other form sufficient to identify, for example, the message to the engine 106, the user, and potentially the communication device at which the message was viewed, in other embodiments.

With that said, in this exemplary embodiment, the engine 106 is configured, often by computer-executable instructions, to perform one or more of the operations described herein. Specifically, for example, the engine 106 is configured, in response to receiving (or otherwise identifying) an assigned electronic tag for an electronic message, to determine if the associated electronic message includes malicious content, through use of one or more tools, such as, for example, Cuckoo Sandbox (available at https://cuckoosandbox.org/) and/or VirusTotal (available at https://www.virustotal.com/), etc. It should be appreciated that one or more other tools may be employed by the engine 106 as well (or alternatively). Then, the engine 106 is configured to assign point(s) to the user who tagged the email, at least when the electronic message includes malicious content, and/or potentially regardless of when the electronic message includes malicious content (e.g., relying on different point values for malicious content versus no malicious content, etc.).

The engine 106 is further configured to total the points for the users, in a running total, or after a defined interval, and to identify and notify at least one user with a point total for the defined interval that is higher than other users who have also tagged electronic messages. The engine 106 may further be configured to compile and cause to be displayed, certain dashboard interfaces, which may be specific to a user or a group of users (e.g., including a leaderboard of multiple users, etc.). Often, apart from the engine 106, a reward or prize would be provided to the winning user (or users) to further incentivize the users and other users to continue to participate in the tagging of suspicious messages. Of course, in one or more embodiments, the engine 106 may be configured with rules, which limit, restrict or otherwise inhibit a user from improperly impacting competition by seeking out malicious content and/or causing certain types of messages to be delivered to himself/herself.

While the configuration of the phishing engine embodiments may vary from implementation to implementation, with different computer-executable instructions arranged in different orders to provide for the operations herein, one example configuration of the engine 106 is provide in the code segment below and the description that follows:

```
1.   index=mail sourcetype=imap
2.   | rex field=To "\<(?P<Email_Address>[^\>]+)\>"
3.   | eval Email_Address=lower(Email_Address)
4.   | rex max_match=10 field=_raw "positives:
     (?<vt_score>.*)"
5.   | rex max_match=10 field=_raw "malscore:
     (?<malscore>.*)"
6.   | stats max(vt_score) as vt_score max(malscore) as
     malscore by Subject,Email_Address,Message_ID
7.   | eval vt_score=if(vt_score>0,vt_score*10,0)
8.   | eval malscore=if(malscore>0,malscore*100,0)
9.   | eval totalscore=vt_score+malscore+.1
10.      | join type=left Email_Address
11.      [|inputlookup soc_user_bus_mapping.csv | eval
     Email_Address=lower(Email_Address)]
12.      | search Employee_Name=*
13.      | stats sum(totalscore) by Email_Address
14.      | sort 5 - sum(totalscore)
```

With reference to the above exemplary code segment, in processing a tagged email, the engine 106 is configured to select an index containing all data [1] and to extract an email address to a new field called "Email_address" [2]. The engine 106 is further configured, based on the new field, to return a lower case version of the email address [3]. The engine 106 is configured to then extract a VirusTotal score ("vt_score") and to count the number of positives [4], to extract a Cuckoo score ("malscore") [5], and to further apply an evaluation function to the "vt_score" and the "malscore" to add the max values, organize, and de-duplicate the data [6], as desired.

The engine 106 is further configured, with reference to the above exemplary code segment, to assign numerical values to the "vt_score" and then assign points based on "if vt_score is greater than 0 then multiply it by 10 points, if not add 0 points" [7], and is configured to assign numerical values to the "malscore" and assign points based on "if malscore is greater than 0 multiply it by 100, if not add 0 points" [8]. In addition, the engine 106 is configured to add the points together, along with 0.1 for each email submitted by the user [9] (i.e., the total score), and to create a relationship for the business unit, the employee, and location [10] [11] [12]. Finally, the engine 106 is configured to total scores/points for each of the email addresses and sort the scores to identify the top five users (or other number of users), based on the total score [14].

Again, it should be appreciated that the above code segment and description of the associated configuration of the engine 106 is merely exemplary and is provided for purposes of illustration only. Nothing in the example should be understood to limit the engine 106 to any particular manner of accomplishing the operations described herein.

Figure 4:
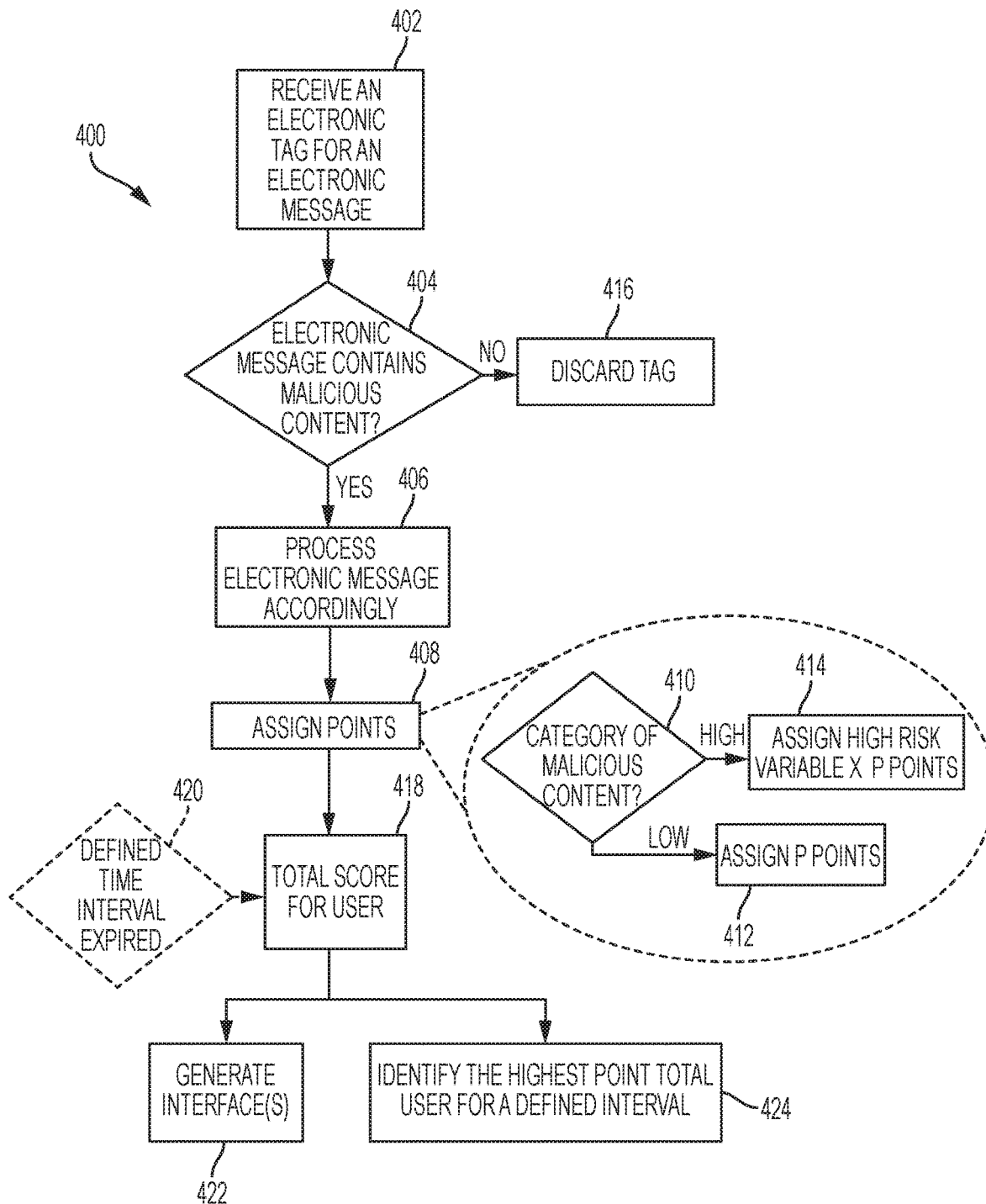
FIG. 4 is an exemplary method, suitable for use with the system of FIG. 1, for identifying, by users, electronic messages perceived to contain malicious content.

FIG. 4 illustrates an exemplary method 400 for use in identifying, detecting, etc. electronic messages (e.g., email messages, etc.) with malicious content. The method 400 is described herein as implemented in the engine 106, with further reference to other parts of the system 100 and with reference to the computing device 200. The systems and computing devices herein should not, however, be understood to be limited to the method 400, as the method may be implemented in other system and/or computing device embodiments. Likewise, the methods described herein should not be understood to be limited to the system 100 and/or the computing device 200.

As shown in FIG. 4, in the method 400, when an electronic message is electronically tagged by one of the users 112 as potentially including malicious content (e.g., via the button 310 in the message interface 300, etc.), the engine 106 receives the tag (and potentially the message), at 402, from the user 112 (i.e., a recipient of the electronic message), and in particular, from the user's communication device 102 (which may forward the message to a message account associated with the engine 106). The engine 106 then stores (not shown) the tag (and potentially the electronic message) in a data structure in memory (e.g., memory 204, etc.) associated with communication device 108. Generally, depending on message traffic within the system 100, for example, the engine 106 receives multiple different tags, from one or more of the communication devices 102 (or from other computing devices) (or the associated users 112), which correspond to electronic messages received through the message server 104.

At 404, the engine 106 initially analyzes the electronic message associated with the received tag to determine if malicious content is indeed included in the message. For example, the engine 106 may subject the message to one or more scanners, or compare the message (or content of the message) to one or more rules, or compare the message to a data structure of known malicious content and/or conventions of malicious content, or launch any potential malware included in the message in a virtualized environment and monitor for unusual behavior, etc. In this particular embodiment, the engine 116 may subject the message to Cuckoo Sandbox (again, available at https://cuckoosandbox.org/) to analyze text and URLs included in the message, and further to VirusTotal (again, available at https://www.virustotal.com/) to analyze any attachments to the messages. The engine 106 may access the message from the tag, or retrieve the message from the message server 104 (e.g., from the user's mail account, or from a message account at the server 104 to which the message may have been forwarded by a communication device (e.g., one of communication devices 102, etc.) at which the message was tagged, etc.), based on one or more indicators of the message included in the tag. Or, the message, along with the tag, may simply be forwarded to the engine 106 by the communication device 102 when the message is tagged, to a particular message account associated with the engine 106.

If the electronic message includes malicious content, at 404, the engine 106 processes the message accordingly, at 406. For example, the engine 106 may delete the message, transmit a warning to the user 112 that originally received the message, transmit warnings to other ones of the users 112 or to administrators in the system 100 (or to other users in general) to monitor for similar messages, update any comparison rules used to check for malicious messages to account for the newly received malicious content as appropriate, etc. As an example, in one embodiment, the engine 106 causes an update to the comparison rules (e.g., rules associated with software and/or tools used in the system 100 to identify and block messages having malicious content, etc.) based on a new signature developed by the engine 106 (or by others) from analysis of the malicious content included in the received message. In particular, the comparison rules are often generated, authorized and/or edited by a service provider (not shown). Then, when the engine 106 detects the newly received malicious content, the engine 106 may automatically (or through manual intervention) forward the malicious content (and/or a description thereof) to the service provider. In doing so, the engine 106 prompts the service provider to update the comparison rules, as needed, and return updated comparison rules to the engine 106, which, in turn, may be implemented by the engine 106 directly or otherwise, potentially after manual review. The updated comparison rules may then be effective at blocking, or flagging, future messages having the same or similar malicious content therein before the message reach the users 112 and their communication devices 102. The updated rules may also be effective at locating and removing other iterations of the message from the message server 104, and/or even removing any associated malware identified from the analysis from the general environment, for example, of system 100.

In addition in the method 400, if the electronic message is determined to include malicious content, the engine 106 assigns points to the tag and/or the user 112 that communicated the tag, at 408. The points can be assigned in any desired manner. For example, in the method 400, the engine 106 assigns points based on the type, or associated risk, of malicious content included in the message. The malicious content may include, without limitation, less risky types, such as spam, and more risky types, such as viruses, worms, Trojans, etc. The points assigned to the tag and/or the user 112, by the engine 106, may generally be higher when the risk associated with the malicious content in the message is higher, i.e., points go up as the risk of the malicious content goes up. With that said, any suitable point valuations and/or assignments may be used, potentially based on their relation to the severity, risk, etc. of the identified malicious content.

As an option in the method 400 for assigning points to the user 112 (including to the tag), at 408 (as indicated by the dotted lines in FIG. 4), the engine 106 may determine, at 410, a category of malicious content included in the corresponding electronic message. The engine 106 then assigns points based on the category. At 412, in this option, when the malicious content falls within a generally low (or generally lower) risk category, the engine 106 may assign P points to the user 112. But, when the malicious content falls into a generally high (or generally higher) risk category, the engine 106 may assign a point value to the user 112, at 414, equal to a high risk variable times P points, for example (where the high risk variable may include any suitable or desired variable generally representative of the generally higher risk associated with the malicious content, as opposed to lower risk malicious content). While only two risk categories are illustrated in the method 400 (as part of assigning the points at 408), it should be appreciated that any different number of categories may be used to differentiate the malicious content (e.g., based on risk, danger, disruption, frequency, or otherwise, etc.), with a different number of points assigned to the different categories, as appropriate. Again, generally, for example, the engine 106 assigns more points for malicious content of a higher, or greater, risk, danger, or disturbance to the system 100, and a lower number of points for malicious content of lower, or less, risk, danger, or disturbance to the system 100. It should also be appreciated that the term "points" may include any measure or any value of one content, versus or relative to, another (or other) content.

Further in the method 400, if, at 404, the engine 106 determines that the electronic message does not include malicious content, the engine 106 simply discards the tag and message, at 416. No points are generally then assigned to the user 112 for the tag or the message. As part of this operation, the engine 106 may also transmit a notification to the user 112 that tagged the message indicating the message is safe, or does not include malicious content. In this manner, the user 112 is made aware of whether or not a real threat existed, or potentially still exists. In addition, in connection with the gamification aspect of the method 400, by this action the user 112 is not awarded any points, based on merely submitting the tag to the engine 106. Points are only awarded for submitted tags associated with messages identified, by the engine 106, as having malicious content as described herein.

Operations 402-416 in the method 400 are repeated, as necessary, by the engine 106 as additional tags are received from the users 112 in the system 100, and in particular, from their communication devices 102.

With continued reference to FIG. 4, when points are assigned to the user 112 at 408, the engine 106 totals the assigned points for the user 112, at 418, and, in some cases, also determines a total point value for each of the users 112. The engine 106 may total the points, as assigned, by adding new points to existing points (if any), thereby maintaining a running total score for the user 112. Alternatively (as indicated by the dotted lines), the engine 106 may maintain a listing of assigned points but total the points, per user 112 (and/or per all users 112), only when a defined interval expires, at 420. It should be appreciated that the engine 106 may total the points for the user 112 (or for all of the users 112) per the defined interval or per multiple intervals, with the intervals being either distinct (i.e., not overlapping), or with the intervals overlapping in certain embodiments. For example, the engine 106 may provide weekly or monthly point totals (associated with one reward), and also provide 6-month and/or annual point totals (associated with a different reward), which may be considered distinct competitions.

As an example, the points may be assigned to the user 112 (or to the tags), and then totaled for a defined interval. The defined interval may include, without limitation, each month, each quarter of the year (e.g., January-March, April-June, etc.), six month periods (i.e., semi-annually), annual periods, etc. Generally, the total for the user is then specific to the defined interval. As such, when points are assigned to the user 112 in February, based on a quarter-year defined interval, the points are totaled, by the engine 106, with other first quarter points (if any), to provide a first quarter total score. Likewise, points assigned to the user 112 in April, would be totaled, by the engine 106, with other second quarter points (if any). It should be appreciated that the assigned points may be totaled in a variety of manners, with other points, as desired, assigned in the same defined interval or not.

In connection with assigning and totaling points (at 408 and 418), the engine 106 may compile (or update) data structures, which reflect various metrics related to emails tagged, malicious content included in the emails, and/or points, for example. In particular, as shown below, Table 1 includes an exemplary data structure, to be viewed by an administrator associated with the engine 106, which includes data for a given interval (e.g., March 30 to June 30, etc.).

TABLE 1

| | |
|---|---|
| Total Emails Submitted = | 81,215 |
| Total URLs Scanned = | 126,755 |
| Average Virus Total Score = | 0.76 |
| Total Attachments Scanned = | 897 |
| Average Cuckoo Score = | 3.66 |
| Top Three Business Units = | Unit A - 65,591.3 points (28,413 emails) |
| | Unit B - 33,130.0 points (12,200 emails) |
| | Unit C - 14,260.2 points (1,602 emails) |

As shown in Table 1, the data structure includes a total number of emails submitted to the engine 106 by the users 112, a total number of URLs scanned (e.g., by Cucckoo, etc.), an a total number of attachments scanned (e.g., by VirusTotal, etc.). The data structure also includes aggregating score information, including an average virus score for the total emails submitted and an average Cuckoo score for the emails. The data structure then further includes a breakdown of scoring for various different business units from which emails are received by the engine 106. It should be appreciated that data structures in other forms, including a variety of other data and/or metrics, may be compiled by the engine 106 as required and/or desired by one or more administrators or other users.

With respect to individual users, the engine 106 may compile (or update) one or more other data structures, which reflect various metrics related to emails tagged, malicious content included in the emails, and/or points, for example. For example, Table 2 illustrates a data structure that is specific to the user 112.

TABLE 2

| | |
|---|---|
| Total Emails = | 1,563 |
| Attachments Score = | 1,380 |
| Max Attachment Score = | 780 |
| Emails URLs Score = | 2,400 |
| Max URL Score = | 20 |
| Total Score = | 3,936.3 |

As shown in Table 2, the data structure includes a total point value for tagged emails submitted by the user (e.g., based on analysis of the email by Cuckoo Sandbox, etc.), a total point value for attachments included in the tagged emails (e.g., based on analysis of the attachments by VirusTotal, etc.), and a total point value for URLs associated with the tagged emails. The data structure also includes data relating to max point values for attachments and URLs, and a total point value, or score, for the user 112. It should be appreciated, as above, that the engine 106 may compile one or more different data structures, including different data and/or metrics in other embodiments.

In combination with the above, in this exemplary embodiment, the engine 106 may generate (or update) one or more interfaces for the user 112 and/or an administrator (or other user) based on one or more data structures, at 422. Example interfaces are described in more detail below, and with respect to FIG. 5. That said, it should be appreciated that interfaces may be generated, and caused to be displayed, to the users 112 and/or administration at any time, including prior to the end of the defined interval (when one or more winners are identified), etc.

With continued reference to FIG. 4, after the defined interval is ended (at 420), or expired, the engine 106, based on the total scores for all of the users 112, identifies the one of the users 112 with the highest point total, at 424. In addition to, or as an alternative, the user 112 with something other than the highest point total may be identified as a champion or winner. For example, for a given time interval, the engine 106 may identify three winners (e.g., first place, second place, and third place, etc.). It should be appreciated that one or more other winners or champions may be identified based on point during a time interval according to a variety of manners.

Once identified, the highest point user (and/or other winner/champions) is then notified, by the engine 106, or by an operator or other user. The notification may be provided as a communication including, for example, an email, or text message to the user.

Additionally, or alternatively, the notification may be delivered to the user 112 with the highest point total and/or other users by one or more dashboard interfaces displayed at one or more communication devices 102 (associated with the champion user 112 or other users) (i.e., caused to be displayed to the user 112 by the engine 106). The interface, in one embodiment, may be specific to the user 112, whereby user credentials permit the user to access and view submitted tags, points assigned to the user (e.g., per submitted tag or otherwise, etc.), and/or point totals for the user 112 to date or for one or more different defined intervals (present or historical, etc.). Such interface may include, for example, data included in Table 2.

Point totals for other users, in various examples, may further be displayed through one or more dashboard interfaces, which may include a leaderboard, for example, to illustrate relative positions of different ones of the users 112 and further facilitate the gamification aspect of the present disclosure, but may be anonymous, or not (although, they may be identified to particular users or classes and/or category of users, in other embodiments).

Figure 5:
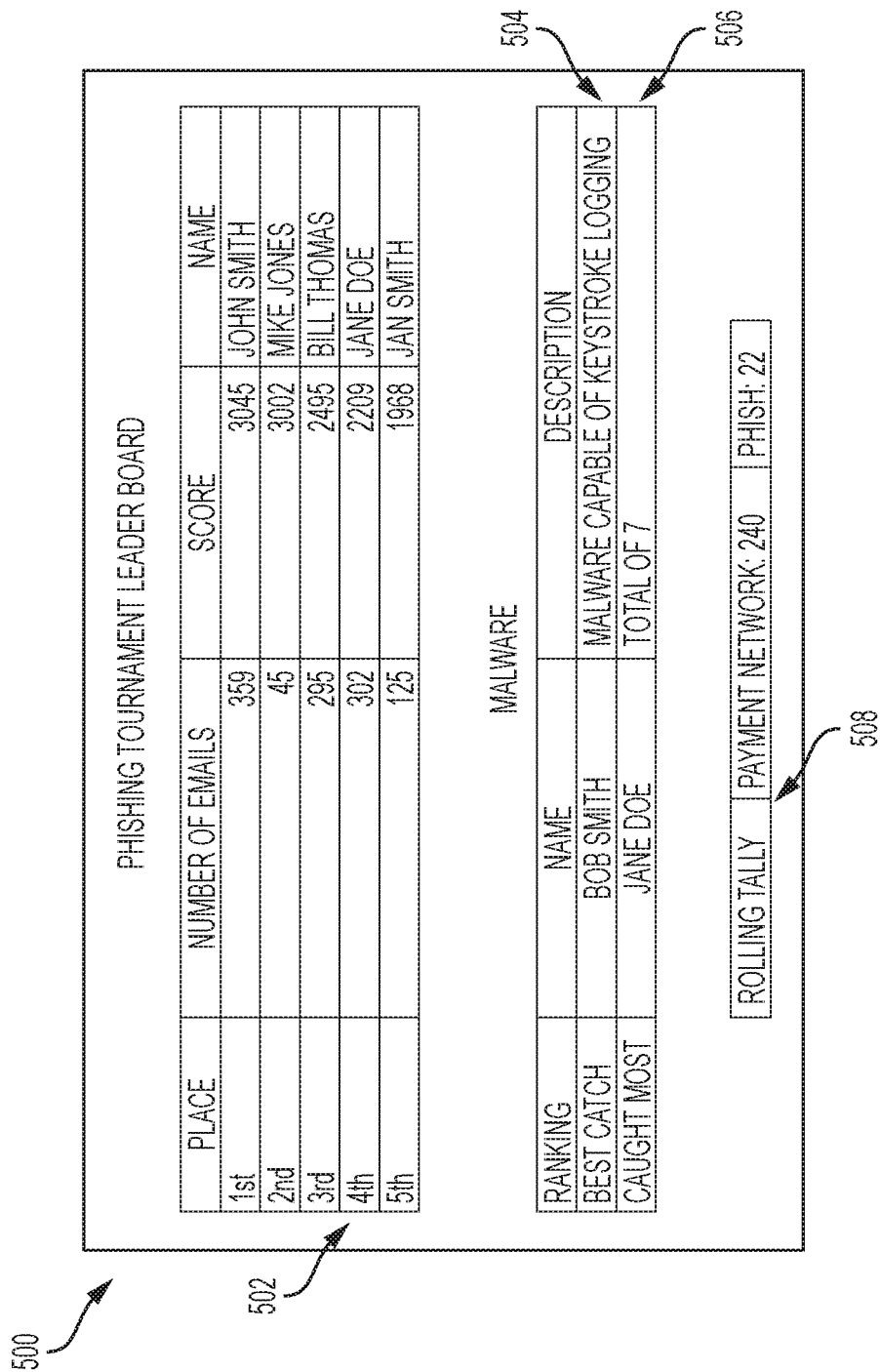
FIG. 5 is an exemplary dashboard interface illustrating relative scoring for different users that have tagged electronic messages based on perception, by the users, of malicious content within the messages.

In another embodiment, the dashboard may be a general dashboard available to all users 112 depicted in FIG. 1 (and/or other users). In connection therewith, for example, FIG. 5 illustrates an exemplary dashboard interface 500 including a leaderboard for a "Phishing Tournament," in which each of the users 112, or a subset of the users 112, that has/have tagged email messages as potentially malicious is listed along with their total points awarded for the tagged email messages. As illustrated, the dashboard interface 500 includes the top five users 112, in order, at 502. However, in other exemplary embodiments, dashboard interfaces may include a listing of more or fewer users. In addition, the illustrated dashboard interface 500 includes an indicator ("Best Catch") 504 of the user that tagged a highest scored message (as described above), and an indicator ("Caught Most") 506 of the user that has accurately tagged the most emails actually having malicious content. Further, the dashboard interface 500 includes a rolling tally 508, which indicates a total number of confirmed malicious emails received by all users 112 (i.e., phish, verses just spam, for example) and a total number of such emails that actually tricked one of the users 112 into taking action (e.g., successful malware or successful tricking of people that the phishing email caused, etc.). As illustrated, 240 total malicious emails have been received, and 22 were acted upon by users 112. Again, it should be appreciated that the users 112 may be identified by name, group, and/or class, or identity of the users 112 may be anonymous (designated by a non-specific identifier, etc.). It should also be appreciated that the dashboard interface 500 may be different for different purposes.

In still another example, an administrator's dashboard interface may be displayed, by the engine 106, which includes different information for review by the administrator only. Such information may include, for example, an email submission count or volume over time (e.g., in a bar graph, other type of graph or visual indicator, etc.), etc. (as described above in connection with Table 1).

In this manner, the gamification aspect may be further incorporated, whereby the users 112 are able to view the total points for themselves and for other users (either identified to the user or anonymous), potentially in the form of a leader board or other relative depiction of tags received, rates of detecting malicious content per tag, total points, etc., over one or more defined intervals. For example, a leader board may show the top three users for the present three month interval (or contest), and a top five users for the one year interval (or contest). In this example, the three-month users with the highest point totals would receive compensation or a prize, and the year-end highest point total user would receive a more substantial compensation or prize. Generally, although it should not be understood to be a limitation of the description herein, the compensation or prize (broadly, reward) is sufficient to interest users in the tagging of electronic messages, but not sufficient to cause users to seek out messages (or send messages to themselves) containing malicious content, or overly tag messages that may not contain malicious content.

As mentioned above, networks, whether commercial-based, education-based, etc., employ a variety of software and tools to attempt to block substantially malicious content from entering, via one or more electronic messages, and creating negative effects or disruptions to the networks (and/or computing devices associated therewith). Despite best efforts, however, the software and/or tools occasionally permit delivery of messages (e.g., emails, etc.), which contain malicious content. In numerous such examples, the message, itself, provides clues that the user should be suspicious of the message, including, for example, an unrecognized sender, a "RE" in the title for a message never previously sent by the user, etc. In view of the above, the systems and methods described herein seek to incentive the users to tag such messages as potentially containing malicious content, so that they may be investigated further and/or removed from the message server, as necessary. In this manner, the systems and methods herein employ the users as a further layer of defense against malicious content.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It should be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving multiple tags, each tag received one of multiple users, each tag associated with an electronic message based on a perception, of the said user, that the message includes malicious content; (b) assigning point(s) to the user; (c) totaling point(s) assigned during a defined interval, per user; (d) identifying a highest point total user for the defined interval; and (e) any of the other methods steps recited in the claims below, or described above.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "connected to," or "coupled to" another element, it may be directly on, connected or coupled to the other element, or intervening elements may be present. In contrast, when an element is referred to as being "directly on," "directly connected to," or "directly coupled to" another element, there may be no intervening elements present. As used herein, the term "and/or" includes any and all combinations of one or more of the associated listed items.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various events that may be included in a travel plan. These terms may only be used to distinguish one element from another. Terms such as "first," "second," and other numerical terms when used herein do not imply a sequence or order unless clearly indicated by the context. Thus, a first check-in communication, or first predetermined time, described and claimed herein, could be termed a second check-in communication or second predetermined time without departing from the teachings of the example embodiments.

What is claimed is:

1. A computer-implemented method for detecting electronic messages containing malicious content, the method comprising:

receiving, by at least one computing device, multiple electronic tags for a plurality of users, each of the multiple electronic tags corresponding to an electronic message and one of the plurality of users and indicating a perception by the one of the plurality of users that the electronic message includes malicious content, and each of the multiple electronic tags generated for the corresponding electronic message based on the perception by the corresponding one of the plurality of users that the electronic message includes the malicious content;

for each of the multiple electronic tags received by the at least one computing device:
  in response to receiving the electronic tag, determining, by the at least one computing device, whether the corresponding electronic message includes malicious content, by at least one of:
    subjecting the corresponding electronic message to one or more scanners;
    comparing the corresponding electronic message to one or more malicious content rules;
    comparing the corresponding electronic message to a data structure of at least one of known malicious content and conventions of malicious content; and
    launching content included in the corresponding electronic message in a virtualized environment and monitoring for unusual behavior; and then
  in response to determining that the corresponding electronic message includes malicious content, assigning, by the at least one computing device, point(s) to the corresponding user when the corresponding electronic message includes malicious content;

during a defined interval, for each of the plurality of users, totaling, by the at least one computing device, the point(s) assigned to the user, such that the point(s) total for each user corresponds to the same defined interval during which the point(s) assigned to the other one(s) of the plurality of users are totaled; and for the defined interval, identifying, by the at least one computing device, one or more of the plurality of users as a winner based on the total point(s) assigned to the one or more of the plurality of users being higher than the total point(s) assigned to any other one(s) of the plurality of users, thereby incentivizing the users to electronically tag electronic messages perceived to include malicious content.

2. The computer-implemented method of claim 1, wherein the malicious content includes one of a first category of malicious content and a second category of malicious content; and
  wherein assigning the point(s) to the corresponding user includes assigning a first number of point(s) to the corresponding user in response to the malicious content including the first category of malicious content, and assigning a second different number of point(s) to the corresponding user in response to the malicious content including the second category of malicious content.

3. The computer-implemented method of claim 1, further comprising, for each of the multiple electronic tags received by the at least one computing device, discarding the electronic tag in response to determining that the corresponding electronic message does not include malicious content; and
  wherein assigning point(s) for each electronic tag includes assigning point(s) only for un-discarded electronic tags.

4. The computer-implemented method of claim 1, further comprising notifying the identified one or more of the plurality of users of being the winner.

5. The computer-implemented method of claim 4, further comprising notifying one or more users, other than the identified one or more of the plurality of users, via at least one dashboard interface.

6. The computer-implemented method of claim 1, wherein the defined interval is a first defined interval; the method further comprising:
  during a second defined interval, for each of the plurality of users, totaling, by the computing device, the point(s) assigned to the user, the second defined interval being distinct from the first defined interval;
  for the second defined interval, identifying, by the computing device, one or more of the plurality of users as a second winner based on the total point(s) assigned to the one or more of the plurality of users being higher than the total point(s) assigned to any other one(s) of the plurality of users; and
  notifying the one or more of the plurality of users identified as the second winner.

7. The computer-implemented method of claim 6, wherein the first defined interval and/or the second defined interval are selected from the group consisting of: 1 month, 3 months, 4 months, 6 months, and 1 year.

8. The computer-implemented method of claim 1, wherein the at least one computing device includes a message server.

9. The computer-implemented method of claim 1, further comprising causing a dashboard to be displayed at a computing device associated with one of the plurality of users, the dashboard including at least the total point(s), to date, for the one of the plurality of users for the defined interval.

10. The computer-implemented method of claim 9, wherein the dashboard further includes a total point(s) to date for at least one other of the plurality of users.

11. The computer-implemented method of claim 9, wherein the dashboard includes the total point(s) for the one of the plurality of users and the at least one other of the plurality of users, in successive order.

12. The computer-implemented method of claim 1, further comprising updating at least one rule associated with blocking malicious content from reaching the plurality of users based on at least one signature developed, by the at least one computing device, based on malicious content included in the electronic messages corresponding to at least some of the received electronic tags.

13. A system for use in detecting electronic messages containing malicious content, the system comprising:
  a message server for handling multiple electronic messages, each electronic message directed to at least one of multiple users; and
  a phishing engine computing device coupled to the message server and configured to:
    receive a tag for one of the multiple electronic messages, from the at least one of the multiple users to which the one of the multiple electronic messages is directed, the at least one of the multiple users being a recipient of said one of the multiple electronic messages, the tag including an indication that the at least one of the multiple users perceives the one of the multiple electronic messages to include malicious content;
    in response to the receipt of the tag, determine if the one of the multiple electronic messages includes malicious content, wherein in order to determine if the one of the multiple electronic message includes malicious content, the phishing engine computing device is configured to at least one of:
      compare the one of the multiple electronic messages to one or more malicious content rules;
      compare the one of the multiple electronic messages to a data structure of known malicious content;

compare the one of the multiple electronic messages to conventions of malicious content; and launch content included in the one of the multiple electronic messages in a virtualized environment and monitor for unusual behavior;

in response to determining that the one of the multiple electronic message includes malicious content and that the malicious content of the one of the multiple electronic messages includes spam, assign a first number of points to the at least one of the multiple users;

in response to determining that the one of the multiple electronic message includes malicious content and that the malicious content of the one of the multiple electronic messages includes at least one of a virus, a worm, and a Trojan, assign a second number of points to the at least one of the multiple users, wherein the second number of points is greater than the first number of points; and after a defined interval, identify and notify one of the multiple users with a point total, for the defined interval, that is higher than others of the multiple users.

14. The system of claim 13, wherein the phishing engine computing device and the message server are included in at least one computing device.

15. The system of claim 13, wherein the phishing engine computing device is further configured to update at least one rule used by the message server to identify and/or block electronic messages having malicious content based on the malicious content included in at least one of the electronic messages associated with one of the received tags.

16. One or more non-transitory computer readable storage media having computer-executable instructions embodied thereon to gamify the detection of malicious content in emails, wherein when executed by a processor, the computer-executable instructions cause the processor to:

receive an electronic tag from a user, the electronic tag associated with an email based on a perception, of said user, that the email includes malicious content;

determine whether the email associated with the tag includes malicious content, by at least one of:
   subjecting the email to one or more scanners;
   comparing the email to one or more malicious content rules;
   comparing the email to a data structure of known malicious content; and
   launching content included in the email in a virtualized environment and monitor for unusual behavior;

when malicious content is determined to be included, assign point(s) to the user;

total the point(s) assigned to the user over a defined interval; and identify the user as a champion, when the total point(s) for the user is better than total point(s) for one or more other users.

17. The one or more non-transitory computer readable storage media of claim 16, wherein a number of point(s) assigned to the user is based on a category of malicious content included in the email.

18. The one or more non-transitory computer readable storage media of claim 17, wherein the tag includes the email forwarded to an email address.

19. The one or more non-transitory computer readable storage media of claim 18, wherein when executed by a processor, the computer-executable instructions further cause the processor to cause a dashboard to be displayed to the user and/or to the one or more other users;

wherein the dashboard includes a leaderboard indicative of the total point(s) for the user and the total point(s) for the one or more other users.

* * * * *